(12) United States Patent
Thiriet et al.

(10) Patent No.: US 10,253,699 B2
(45) Date of Patent: Apr. 9, 2019

(54) DEVICE AND METHOD FOR TESTING THE INTEGRITY OF A HELICOPTER TURBINE ENGINE RAPID RESTART SYSTEM

(71) Applicant: Safran Helicopter Engines, Bordes (FR)

(72) Inventors: Romain Thiriet, Jurancon (FR); Jean-Michel Bazet, Gelos (FR); Camel Serghine, Boeil-Bezing (FR); Patrick Marconi, Gelos (FR); Jérôme Irigoyen, Pau (FR); Stephen Langford, Pau (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 47 days.

(21) Appl. No.: 15/514,320

(22) PCT Filed: Sep. 21, 2015

(86) PCT No.: PCT/FR2015/052529
§ 371 (c)(1),
(2) Date: Mar. 24, 2017

(87) PCT Pub. No.: WO2016/051048
PCT Pub. Date: Apr. 7, 2016

(65) Prior Publication Data
US 2017/0218847 A1    Aug. 3, 2017

(30) Foreign Application Priority Data

Sep. 29, 2014 (FR) ..................................... 14 59165

(51) Int. Cl.
*G01M 15/14* (2006.01)
*F02C 7/277* (2006.01)
(Continued)

(52) U.S. Cl.
CPC .............. *F02C 7/277* (2013.01); *B64C 27/04* (2013.01); *B64D 27/10* (2013.01); *B64D 31/06* (2013.01);
(Continued)

(58) Field of Classification Search
USPC ................ 73/112.01, 112.02, 112.03, 112.04
See application file for complete search history.

(56) References Cited

U.S. PATENT DOCUMENTS 3,107,489 A    10/1963  Palfreyman
8,291,715 B2   10/2012  Libera et al.
(Continued)

FOREIGN PATENT DOCUMENTS

EP    2 514 949 A2    10/2012

OTHER PUBLICATIONS

Written Opinion of the International Searching Authority dated Dec. 18, 2015, issued in corresponding International Application No. PCT/FR2015/052529, filed Sep. 21, 2015, 7 pages.
(Continued)

*Primary Examiner* — Eric S. McCall
(74) *Attorney, Agent, or Firm* — Christensen O'Connor Johnson Kindness PLLC

(57) ABSTRACT

A device for integrity testing a system for rapid reactivation of a turboshaft engine of a helicopter, includes a pneumatic turbine that is mechanically connected to the turboshaft engine and is supplied with gas, upon a command, by a pneumatic supply circuit such that it is possible to rotate the turboshaft engine and ensure that it is reactivated. The testing device has an apparatus configured to withdraw pressurized air from the turboshaft engine and a duct for conveying the withdrawn air to the pneumatic circuit for supplying the pneumatic turbine with gas. The device further includes a sensor for determining the rotational speed of the pneumatic turbine.

10 Claims, 1 Drawing Sheet

(51) Int. Cl.
    *F02C 6/08*     (2006.01)
    *B64C 27/04*     (2006.01)
    *B64D 27/10*     (2006.01)
    *B64D 31/06*     (2006.01)

(52) U.S. Cl.
    CPC .......... *F02C 6/08* (2013.01); *F05D 2220/329* (2013.01); *F05D 2260/80* (2013.01); *F05D 2260/83* (2013.01); *F05D 2270/304* (2013.01); *Y02T 50/671* (2013.01)

(56) References Cited

U.S. PATENT DOCUMENTS

| 2013/0051975 | A1 | 2/2013 | Makulec et al. | |
|---|---|---|---|---|
| 2014/0178175 | A1 | 6/2014 | Kalkovich et al. | |
| 2016/0298486 | A1* | 10/2016 | Langford | F01D 21/02 |
| 2016/0311548 | A1* | 10/2016 | Thiriet | B64D 31/06 |
| 2017/0016398 | A1* | 1/2017 | Thiriet | F01D 19/00 |
| 2017/0101936 | A1* | 4/2017 | Marconi | F02C 3/10 |
| 2017/0248080 | A1* | 8/2017 | Chevalier | F02C 7/275 |
| 2017/0305541 | A1* | 10/2017 | Vallart | B64C 27/14 |

OTHER PUBLICATIONS

International Preliminary Report on Patentability dated Apr. 4, 2017, issued in corresponding International Application No. PCT/FR2015/052529, filed Sep. 21, 2015, 1 page.
International Search Report dated Dec. 18, 2015, issued in corresponding International Application No. PCT/FR2015/052529, filed Sep. 21, 2015, 7 pages.
Written Opinion of the International Searching Authority dated Dec. 18, 2015, issued in corresponding International Application No. PCT/FR2015/052529, filed Sep. 21, 2015, 6 pages.

* cited by examiner

DEVICE AND METHOD FOR TESTING THE INTEGRITY OF A HELICOPTER TURBINE ENGINE RAPID RESTART SYSTEM

1. TECHNICAL FIELD OF THE INVENTION

The invention relates to a device and to a method for integrity testing a system for rapid reactivation of a turboshaft engine. The invention also relates to a helicopter turboshaft engine provided with an integrity testing device of this type.

2. TECHNOLOGICAL BACKGROUND

As is known, a twin-engine or three-engine helicopter has a propulsion system comprising two or three turboshaft engines, each turboshaft engine comprising a gas generator and a free turbine which is rotated by the gas generator and is rigidly connected to an output shaft. The output shaft of each free turbine is suitable for putting into motion a power transmission gearbox, which itself drives the rotor of the helicopter.

It is known that, when the helicopter is in a cruising flight situation (i.e. when it is progressing in normal conditions, during all the flight phases apart from transitional phases of take-off, climbing, landing or hovering flight), the turboshaft engines operate at low power levels, below their maximum continuous output. These low power levels give rise to a specific consumption (hereinafter Cs), defined as the ratio between the hourly consumption of fuel by the combustion chamber of the turboshaft engine and the mechanical power supplied by this turboshaft engine, greater than approximately 30% of the Cs of the maximum take-off power, and therefore give rise to overconsumption of fuel in cruising flight.

Moreover, the turboshaft engines of a helicopter are designed so as to be oversized in order to be able to keep the helicopter in flight in the event of failure of one of the engines. This flight situation occurs following the loss of an engine, and results in the fact that each functioning engine provides a power that is significantly greater than its rated power in order to allow the helicopter to overcome a dangerous situation, and to then continue its flight.

The turboshaft engines are also oversized so as to be able to ensure flight over the entire flight range specified by the aircraft manufacturer, and in particular flight at high altitudes and during hot weather. These flight points, which are very restrictive, in particular when the helicopter has a weight that is close to its maximum take-off weight, are only encountered in specific use cases.

These oversized turboshaft engines are disadvantageous in terms of weight and fuel consumption. In order to reduce this consumption in cruising flight, it is conceivable to put at least one of the turboshaft engines on standby in flight. The active engine or engines then operate at higher power levels in order to provide all the necessary power, and therefore at more favourable Cs levels.

Putting a turboshaft engine on standby involves a rapid reactivation system that makes it possible to rapidly bring the turboshaft engine out of standby when it is needed. This need may for example arise from one of the active engines failing or from the flight conditions unexpectedly deteriorating, requiring full power to be reinstated rapidly.

The applicant has already proposed a rapid reactivation system that uses a pneumatic turbine that is mechanically connected to the turboshaft engine and is configured such that it can transform the power from the pressurised gas at the turbine inlet into mechanical power that drives the gas generator of the turboshaft engine. The supply of gas to the pneumatic turbine may for example be achieved by the cooperation of a pneumatic store and a controlled fast-opening valve or by a solid-propellant storage device.

The applicant has therefore sought to develop a method and a device for integrity testing the rapid reactivation system such that it is possible to ensure that the rapid reactivation system operates and can be used during flight.

3. OBJECTS OF THE INVENTION

The invention aims to provide a method and a device for integrity testing a system for rapid reactivation of a turboshaft engine.

The invention aims in particular to provide, in at least one embodiment, an integrity testing device that can be easily integrated in an architecture of a propulsion system of a twin-engine or three-engine helicopter.

The invention also aims to provide, in at least one embodiment of the invention, an integrity testing method that can be implemented on the ground before take-off or during flight, before a turboshaft engine is put on standby.

The invention also aims to provide a turboshaft engine provided with an integrity testing device according to the invention.

4. DISCLOSURE OF THE INVENTION

To do this, the invention relates to a device for integrity testing a system for rapid reactivation of a turboshaft engine of a helicopter, comprising a pneumatic turbine that is mechanically connected to the turboshaft engine and is supplied with pressurised gas, upon a command, by a pneumatic supply circuit such that it is possible to rotate said turboshaft engine and ensure that it is reactivated.

A device according to the invention is characterised in that it comprises:
  means for withdrawing pressurised air from the turboshaft engine,
  a duct for conveying said withdrawn air to said pneumatic circuit for supplying said pneumatic turbine with gas,
  means for determining the rotational speed of said pneumatic turbine.

A device according to the invention therefore makes it possible to test the integrity of the kinematic chain of a system for rapid reactivation of a turboshaft engine. In particular, it makes it possible to verify that the pneumatic turbine is indeed rotated when pressurised air withdrawn from the turboshaft engine, for example air at a moderate pressure, is injected at the turbine inlet. A device according to the invention makes it possible to test the entire kinematic chain of the rapid reactivation system, in particular the pneumatic turbine per se, but also the rotor of the turbine and its bearings, and any mechanical elements that are arranged upstream of the pneumatic turbine. An integrity testing device of this type is separate from the rapid reactivation system. In particular, the duct for conveying the air withdrawn from the turboshaft engine is separate from the gas supply circuit of the rapid reactivation system.

Advantageously, a device according to the invention comprises an electrovalve arranged in the region of the joining point between the pneumatic circuit and said air-conveying duct, said electrovalve being configured to open an air passage between said air-conveying duct and said pneumatic circuit upon a command from a control unit and in the absence of a pressurised gas supply from said pneumatic circuit, and to close said air passage in the absence of a command or in the presence of a pressurised gas supply from said pneumatic circuit.

The control unit is for example the electronic control computer of the helicopter (more commonly known by the acronym EECU). This control unit controls the electrovalve so that it opens an air passage between the air-conveying duct and the pneumatic supply circuit of the pneumatic turbine. If the integrity test is not carried out, the electrovalve closes the air passage. Furthermore, the electrovalve of course closes the air passage if the pneumatic circuit is supplied with pressurised gas. The pneumatic circuit and the pneumatic turbine of the reactivation system are therefore not disrupted by the integrity testing device.

Advantageously and according to the invention, said electrovalve comprises a preloaded spring suitable for keeping the air passage closed in the absence of a command or in the presence of a pressurised gas supply from said pneumatic circuit.

During the rapid reactivation procedure, the electrovalve is of course kept in the closed position by the pressure exerted by the gas flowing in the pneumatic circuit. To do this, the force exerted on the spring to compress it in order to open the air passage is less than the pressure exerted by the hot pressurised gas that flows in the pneumatic circuit during a procedure for rapid reactivation of the turboshaft engine.

Furthermore, the preloaded spring makes it possible to ensure that the air passage is closed in the absence of a command by counteracting the pressure exerted by the pressurised air that is withdrawn from the turboshaft engine and is present in the air-conveying duct.

Advantageously and according to the invention, the means for withdrawing pressurised air from the turboshaft engine are arranged in the region of a compressor of said turboshaft engine.

A turboshaft engine conventionally comprises at least one compressor stage, preferably a first compressor stage and a second compressor stage. The means for withdrawing pressurised air may therefore be arranged on one and/or the other of the compressor stages. These withdrawal means are formed for example by a dedicated boss on the outer casing of the turboshaft engine in the region of one and/or the other of the compressor stages. The air thus withdrawn has a moderate pressure of approximately 2 to 15 bar.

The invention also relates to a helicopter turboshaft engine provided with a rapid reactivation system, comprising a pneumatic turbine that is mechanically connected to said turboshaft engine and is supplied with pressurised gas, upon a command, by a pneumatic supply circuit such that it is possible to rotate said turboshaft engine and ensure that it is reactivated.

A turboshaft engine according to the invention is characterised in that it comprises a device for integrity testing said rapid reactivation system according to the invention.

The invention also relates to a method for integrity testing a system for rapid reactivation of a turboshaft engine, comprising a pneumatic turbine that is mechanically connected to said turboshaft engine and is supplied with pressurised gas, upon a command, by a pneumatic supply circuit such that it is possible to rotate said turboshaft engine and ensure that it is reactivated.

The method according to the invention is characterised in that it comprises:
- a step of withdrawing pressurised air from the turboshaft engine,
- a step of conveying said air to said pneumatic turbine,
- a step of measuring the rotational speed of said pneumatic turbine.

A method according to the invention is advantageously implemented by a device according to the invention, and a device according to the invention advantageously implements a method according to the invention.

The method according to the invention may be implemented on the ground, before the helicopter takes off, during flight or before the turboshaft engine is put on standby.

Advantageously, a method according to the invention comprises a step of comparing the measured rotational speed of said pneumatic turbine with a predetermined threshold speed.

The predetermined threshold speed is defined for example as a predetermined percentage of the minimum rotational speed of the gas turbine of the turboshaft engine. If the speed measured during the speed-measuring step is greater than the threshold speed, the rapid reactivation system is considered to be operating correctly. If the measured speed is less than the predetermined threshold speed, the system is considered to be unreliable and the turboshaft engine is prevented from being put on standby.

Advantageously and according to the invention, said air-conveying step comprises a step of commanding the opening of an electrovalve arranged in the region of the joining point between the pneumatic circuit and said air-conveying duct, said electrovalve being configured to open an air passage between said air-conveying duct and said pneumatic circuit upon a command from a control unit and in the absence of a pressurised gas supply from said pneumatic circuit, and to close said air passage in the absence of a command or in the presence of a pressurised gas supply from said pneumatic circuit.

Advantageously, a method according to the invention comprises a step of detecting if said electrovalve is opened in an untimely manner by means of a non-zero speed measurement for said pneumatic turbine in the absence of a command to open said electrovalve and when the procedure for rapid reactivation of the turboshaft engine is not in operation.

In the absence of a procedure for rapid reactivation of the turboshaft engine and for implementing an integrity test, the pneumatic turbine should not be rotated. In addition, the invention provides a step of detecting if said electrovalve is opened in an untimely manner by means of the non-zero rotational speed measurement for the pneumatic turbine. This step can be implemented at predetermined intervals in order to verify that the testing device has not failed. If the measured speed is not zero, in the absence of a rapid reactivation procedure and in the absence of an integrity test, this means that the testing device has failed.

Advantageously, a method according to the invention comprises a step of saving speed measurements for said pneumatic turbine such that it is possible to monitor the trend for the state of the pneumatic turbine.

The invention also relates to an integrity testing device, to an integrity testing method, and to a turboshaft engine provided with an integrity testing device, characterised in combination by all or some of the features mentioned above or in the following.

5. LIST OF DRAWINGS

Other aims, features and advantages of the invention will become apparent upon reading the following description, which is given purely by way of non-limiting example and relates to the accompanying drawings, in which.

6. DETAILED DESCRIPTION OF AN EMBODIMENT OF THE INVENTION

Figure 1:
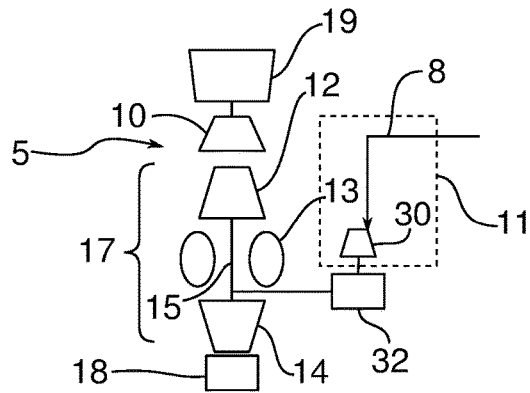
FIG. 1 is a schematic view of a turboshaft engine provided with a rapid reactivation system.

In the drawings, the scales and proportions are not respected for the sake of illustration and clarity.

FIG. 1 schematically shows a turboshaft engine 5 suitable for being put on standby mode and provided with a rapid reactivation system comprising a pneumatic turbine.

This turboshaft engine 5 comprises a gas generator 17 and a free turbine 10 supplied by the generator 17. The gas generator 17 comprises an air compressor 14 to which air is supplied by an air inlet 18. The compressor 14 supplies a fuel, in the compressed air, to a combustion chamber 13, which fuel releases burned gases that provide kinetic energy. A turbine 12 for partially expanding the burned gases is coupled to the compressor 14 by means of a drive shaft 15 so as to be able to rotate the compressor 14 and the equipment necessary for the operation of the gas generator or the helicopter. This equipment is arranged in an accessory gearbox 32. The resultant portion of the burned gases drives the free power transmission turbine 10 in connection with a power transmission gearbox (hereinafter PTG) of the helicopter, and is then discharged through the exhaust 19.

The rapid reactivation system 11 comprises a pneumatic turbine 30 which, according to the embodiment in FIG. 1, is mechanically connected to the turboshaft engine by means of the accessory gearbox 32. This pneumatic turbine 30 is supplied with gas by a gas supply circuit 8, which is not described in detail.

Figure 2:
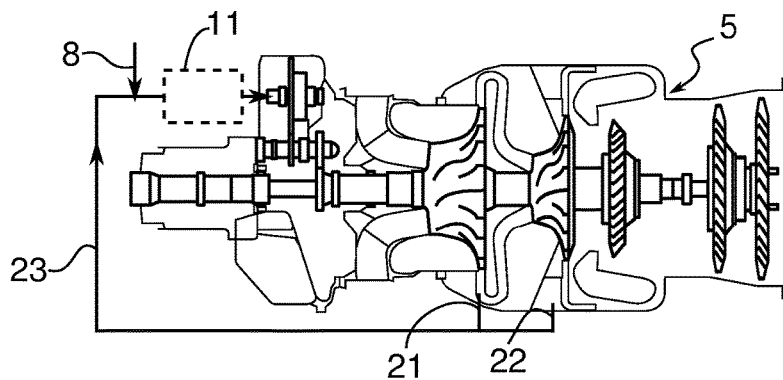
FIG. 2 is a schematic view of a turboshaft engine provided with a device for integrity testing a rapid reactivation system, according to an embodiment of the invention.

An integrity testing device according to the invention comprises, as shown in FIG. 2, means 21, 22 for withdrawing pressurised air from the turboshaft engine, a duct 23 for conveying said withdrawn air to said pneumatic circuit 8 for supplying gas to said pneumatic turbine 30, and means for determining the rotational speed of said pneumatic turbine.

The means for determining the rotational speed are not shown in the drawings for reasons of clarity. These means for example comprise a speed sensor mounted on the shaft of the pneumatic turbine 30. This sensor is connected to a processing module, and is for example arranged in a computer provided with a microprocessor. Preferably, the processing module is directly arranged in the unit for regulating and controlling the helicopter (not shown in the drawings for reasons of clarity).

According to an embodiment, this processing module comprises a configurable memory designed to contain a value for a threshold speed, for example expressed by a percentage of the nominal speed of the gas turbine. If the rotational speed of the pneumatic turbine 30 measured by the speed sensor is greater than the threshold speed, the integrity of the rapid reactivation system is therefore confirmed.

In order to supply air to the pneumatic turbine 30 during a procedure for testing the integrity of the reactivation system, according to an advantageous embodiment, the invention provides an electrovalve 33 arranged in the region of the joining point between the pneumatic circuit 8 and the air-conveying duct 23. This electrovalve 33 is shown in FIGS. 3 and 4.

The electrovalve 33 is configured to open an air passage 34 between the conveying duct 23 and the pneumatic circuit 8 upon a command from a control unit (not shown in the drawings), for example the EECU of the helicopter, and to close said air passage 34 in the absence of a command. The electrovalve 33 comprises a preloaded spring 35 suitable for keeping the air passage closed in the absence of a command.

Figures 3, 4:
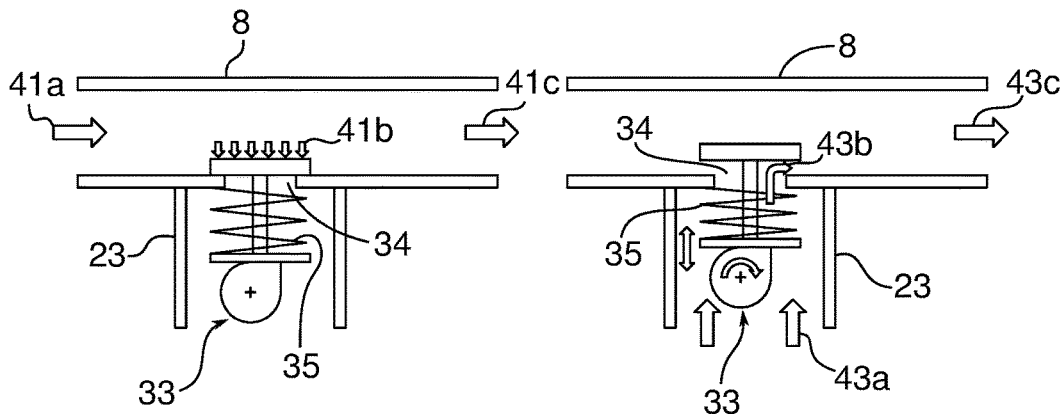
FIG. 3 is a schematic view of an electrovalve of an integrity testing device according to an embodiment of the invention, in a closed position.
FIG. 4 is a schematic view of an electrovalve of an integrity testing device according to an embodiment of the invention, in an open position.

In FIG. 3, the air passage 34 is closed by the electrovalve 33. This position corresponds both to the absence of integrity testing and to the absence of a reactivation procedure. This is the default position. The electrovalve 33 is thus kept in the closed position by the action of the spring 35. The position in FIG. 3 also corresponds to the position during the procedure for reactivating the turboshaft engine. In this case, the pneumatic circuit 8 conveys a pressurised gas, shown by the arrows 41a, 41b and 41c in FIG. 3, to the pneumatic turbine 30. The pressure of the gas keeps the electrovalve 33 in the closed position. This pressure is shown by the arrows 41b on FIG. 3.

FIG. 4 shows the position of the electrovalve 33 during a procedure for integrity testing the rapid reactivation system. The air withdrawn from the turboshaft engine flows in the conveying duct 23, passes through the passage 34, and enters the pneumatic circuit 8 in order to be conveyed towards the pneumatic turbine 30. The conveying of the air during the integrity testing procedure is shown by the arrows 43a, 43b and 43c in FIG. 4.

The invention also relates to a method for integrity testing a system for rapid reactivation of a turboshaft engine, comprising a step of withdrawing pressurised air from the turboshaft engine, a step of conveying said air to said air turbine and a step of measuring the rotational speed of said air turbine.

According to an embodiment, the method further comprises a step of comparing the measured rotational speed of said pneumatic turbine with a predetermined threshold speed. It may also comprise a step of detecting if said electrovalve is opened in an untimely manner by means of a non-zero speed measurement for said pneumatic turbine in the absence of a command to open said electrovalve and when the procedure for rapid reactivation of the turboshaft engine is not in operation. It may also comprise a step of saving speed measurements for said pneumatic turbine such that it is possible to monitor the trend for the state of the pneumatic turbine.

Each step of the method according to the invention is advantageously implemented by an integrity testing device according to the invention.

The invention claimed is:

1. A device for integrity testing a system for rapid reactivation of a turboshaft engine of a helicopter, comprising a pneumatic turbine that is mechanically connected to said turboshaft engine and is supplied with pressurised gas, upon a command, by a pneumatic supply circuit such that it is possible to rotate said turboshaft engine and ensure that the turboshaft engine is reactivated, said testing device comprising:
   an apparatus configured to withdraw pressurised air from the turboshaft engine;
   a duct configured to convey said withdrawn pressurised air to said pneumatic circuit for supplying said pneumatic turbine; and
   a sensor configured to determine the rotational speed of said pneumatic turbine.

2. The device according to claim 1, further comprising an electrovalve arranged in a region of a joining point between the pneumatic circuit and said air-conveying duct, said electrovalve being configured to open an air passage between said air-conveying duct and said pneumatic circuit upon a command from a control unit and in the absence of a pressurised gas supply from said pneumatic circuit, and to close said air passage in the absence of a command or in the presence of a pressurised gas supply from said pneumatic circuit.

3. The device according to claim 2, wherein said electrovalve comprises a preloaded spring configured to keep the air passage closed in the absence of a command or in the presence of a pressurised gas supply from said pneumatic circuit.

4. The device according to claim 1, wherein said apparatus for withdrawing pressurised air from the turboshaft engine is arranged in a region of a compressor of said turboshaft engine.

5. A helicopter turboshaft engine provided with a rapid reactivation system, comprising a pneumatic turbine that is mechanically connected to said turboshaft engine and is supplied with pressurised gas, upon a command, by a pneumatic supply circuit such that it is possible to rotate said turboshaft engine and ensure that it is reactivated, further comprising a device for integrity testing said rapid reactivation system according to claim 1.

6. A method for integrity testing a system for rapid reactivation of a turboshaft engine of a helicopter comprising a pneumatic turbine that is mechanically connected to said turboshaft engine and is supplied with pressurised gas, upon a command, by a pneumatic supply circuit such that it is possible to rotate said turboshaft engine and ensure that it is reactivated, the method comprising the steps of:
withdrawing pressurised air from the turboshaft engine;
conveying said air to said pneumatic turbine; and
measuring the rotational speed of said pneumatic turbine.

7. The method according to claim 6, further comprising a step of comparing the measured rotational speed of said pneumatic turbine with a predetermined threshold speed.

8. The method according to claim 7, wherein said air-conveying step comprises a step of commanding the opening of an electrovalve arranged in a region of a joining point between the pneumatic circuit and said air-conveying duct, said electrovalve being configured to open an air passage between said air-conveying duct and said pneumatic circuit upon a command from a control unit and in the absence of a pressurised gas supply from said pneumatic circuit, and to close said air passage in the absence of a command or in the presence of a pressurised gas supply from said pneumatic circuit.

9. The method according to claim 8, further comprising a step of detecting if said electrovalve is opened in an untimely manner by means of a non-zero speed measurement for said pneumatic turbine in the absence of a command to open said electrovalve and when a procedure for rapid reactivation of the turboshaft engine is not in operation.

10. The method according to claim 6, further comprising a step of saving speed measurements for said pneumatic turbine such that it is possible to monitor a trend for a state of the pneumatic turbine.

* * * * *